United States Patent [19]

Weeks et al.

[11] Patent Number: 5,072,325
[45] Date of Patent: Dec. 10, 1991

[54] VIDEOTAPE CARTRIDGE FOR USE WITH AN ADAPTOR

[75] Inventors: Jerrold K. Weeks, Hudson, Wis.; James E. Skavnak, Minneapolis; Thomas A. Turgeon, Fridley, both of Minn.

[73] Assignee: Minnesota Mining and Manufacturing Company, St. Paul, Minn.

[21] Appl. No.: 482,071

[22] Filed: Feb. 20, 1990

[51] Int. Cl.⁵ .......................................... G11B 23/107
[52] U.S. Cl. .................................................. 360/132
[58] Field of Search .......................... 360/132, 94, 95; 242/197, 198, 199

[56] References Cited

U.S. PATENT DOCUMENTS 3,836,096  9/1974  Fukushima et al. ............... 242/197
3,857,531  12/1974  Jantzen ............................. 242/197

Primary Examiner—Robert S. Tupper
Attorney, Agent, or Firm—Merchant, Gould, Smith, Edell, Welter & Schmidt

[57] ABSTRACT

A videotape cartridge and adaptor having an internal ratchet brake mechanism to engage the cartridge tape supply reel for preventing tape spillage and having an external shape which cooperates with the adaptor to locate and protect tape interconnection mechanisms.

8 Claims, 9 Drawing Sheets

FIG. 9     OVER RUNNING ACTION

FIG. 10     BRAKING ACTION

5,072,325

VIDEOTAPE CARTRIDGE FOR USE WITH AN ADAPTOR

FIELD OF THE INVENTION

The present invention relates to magnetic tape cartridges and an adaptor for using a cartridge in a videotape machine. The tape cartridge is inserted into an adaptor which adapts the cartridge to the VHS standard videocassette format.

DESCRIPTION OF THE PRIOR ART

Most home videotape machines use magnetic recording media supplied in a videocassette format. The typical videocassette contains both a supply reel and a take-up reel. The inclusion of the empty take-up reel within the videocassette housing makes this format inefficient for tape storage.

The storage of videotape on a single supply reel tape cartridge is an attractive alternative to the videocassette because more of the volume is devoted to tape storage. An example of a prior art videotape cartridge is known from British Patent Application GB 2,162,150A, published 29 January 1986. This reference teaches a single spool video cartridge which may be utilized with a standard video recorder that is equipped with a modified cassette. The modified cassette receives the video cartridge and carries a specially adapted take-up spool which engages a leader pulled from the cartridge. In operation, the tape leader is physically inserted into the central spider of the take-up spool.

This reference illustrates one of several problems which must be addressed to produce a commercially useful video-cartridge product. For example, commercial acceptance requires that both, the insertion of the cartridge into the adaptor, and that the preparation of the adaptor for insertion into the videocassette machine, be accomplished quickly and easily and with a minimum of operator attention or skill.

SUMMARY OF THE INVENTION

In contrast to prior art structures, the present invention discloses a videotape cartridge which has, an external shape which facilitates its use with the adaptor and internal mechanisms which facilitate tape handling and connection.

The external shape of the cartridge cooperates with a complimentary door pocket in the adaptor which art together to position the cartridge. The external shape of the cartridge is also formed so as to cooperate with the adaptor to assist in locating the tape interconnection mechanisms and to guide the cartridge into engagement with the adaptor.

The adaptor itself has a pivotally mounted door which includes the door pocket which is adapted to receive the cartridge. The shape of the door pocket assists in the alignment of the cartridge, while the pivoting door assists in guiding the cartridge into the adaptor. The door is also structured to protect several interconnection elements which are located in the adaptor.

An internal ratchet/brake mechanism is incorporated in the cartridge. The ratchet/brake prevents tape "spillage" and permits tape slack within the cartridge to be taken up manually.

The videotape cartridge includes a supply of magnetic recording tape wound onto a supply reel. The ratchet/brake mechanism engages this supply reel and permits the supply reel to be manually rotated in the "rewind" direction, but prevents rotation in the reverse play direction. This action prevents the tape from being inadvertently pulled out of the cartridge in the "play" direction.

BRIEF DESCRIPTION OF THE DRAWING

In the drawing, in which like reference numerals indicate corresponding structures throughout the views.

DETAILED DESCRIPTION OF THE PREFERRED EMBODIMENT

In the following detailed description of the preferred embodiment, reference is made to an illustrative embodiment of the invention. It is to be understood that other embodiments may be utilized without departing from the scope of the present invention.

In general terms, the cartridge 10 is designed to be used with an adaptor 12. The cartridge 10 is shown in isolation in FIG. 1 and the adaptor 12 is shown in FIG. 6.

Figure 1:
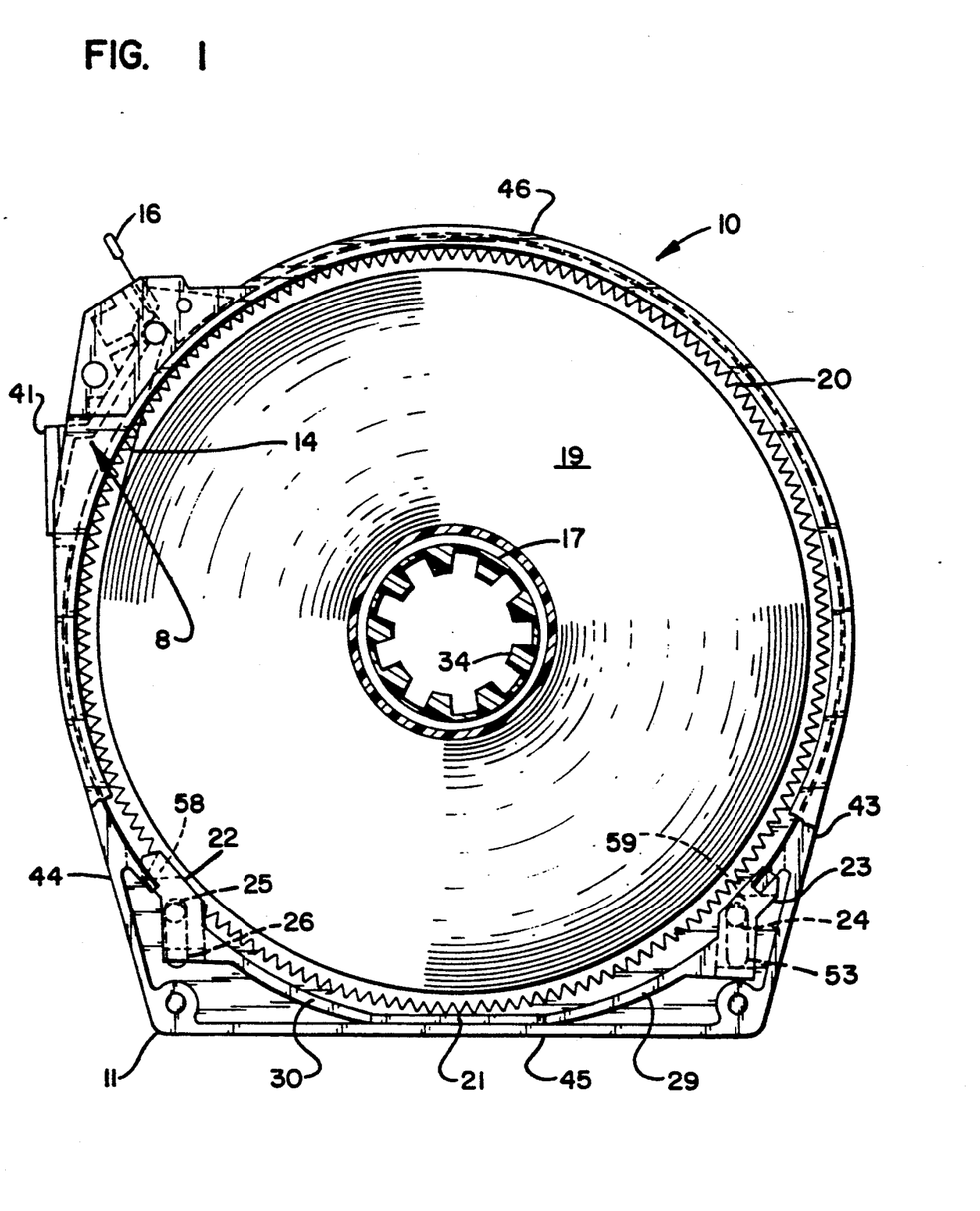
FIG. 1 is a sectional view of the cartridge.

The cartridge housing 11, shown in crossection, has lateral sides 43 and 44 which form a truncated wedge shape with base surface 45. The remaining surface is semicircular in crossection and forms the remaining side 46 of the cartridge housing 11.

Figure 6:
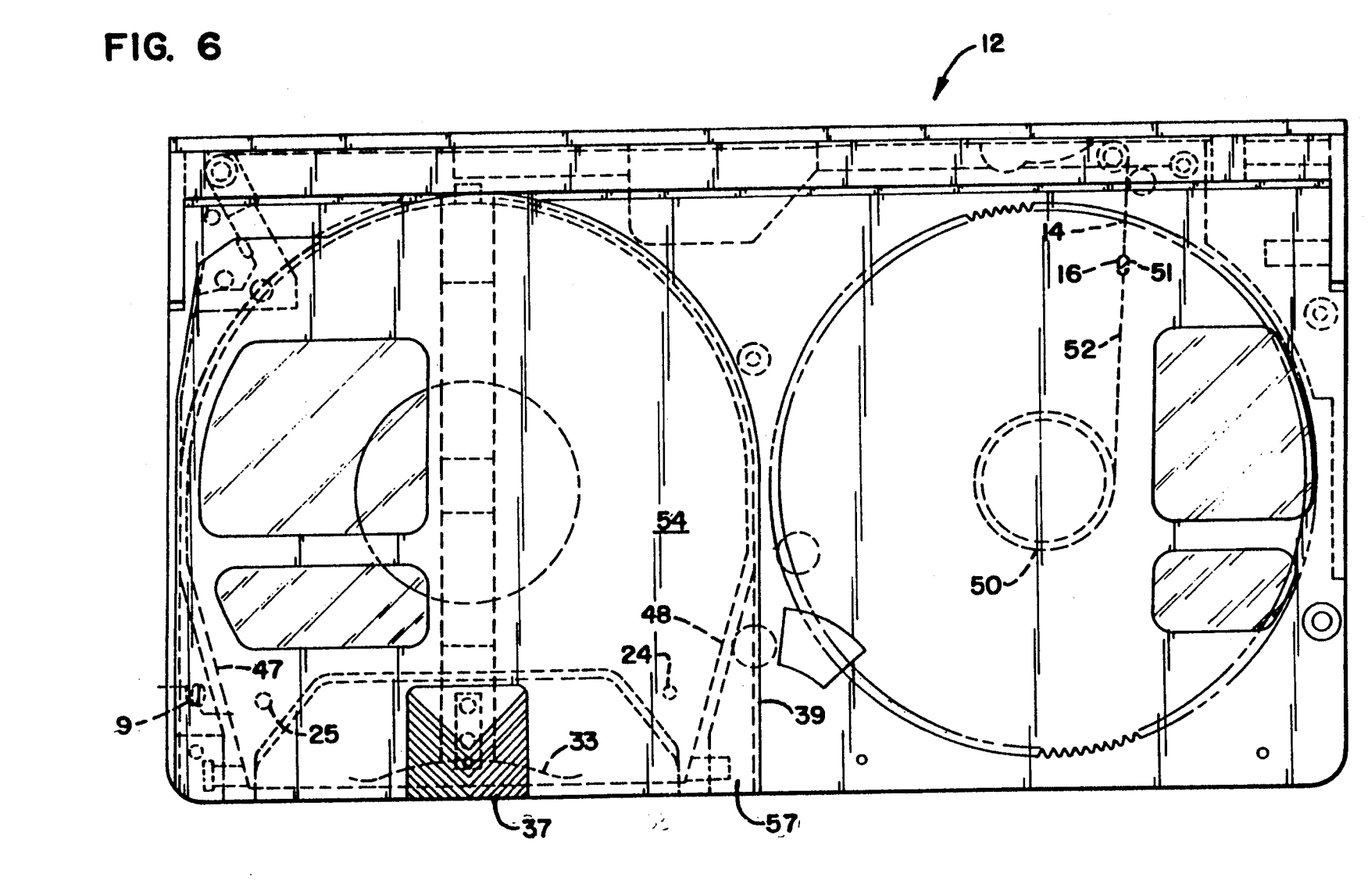
FIG. 6 is a top view of the adaptor showing the door pocket in phantom view.

The insertion process begins with the placement of the cartridge 10 into the door pocket 54 of the adaptor door 39 as shown in FIG. 6.

The adaptor door 39 has corresponding edges 47 and 48 (FIG. 6 and 7) which engage and cooperate with the sides of the cartridge 43 and 44 to position the cartridge within the door. The cartridge base 45 has a slight clearance with the bottom of the door pocket so that the cartridge is located by the wedging contact between the cartridge sides and the door pocket sides. The adaptor door 39 is shown in the "open" position 13 in FIG. 4, with the cartridge seated in the door pocket. The door itself is shown in FIG. 7 where the pocket edges 47 and 48 are shown in isolation.

Figure 4:
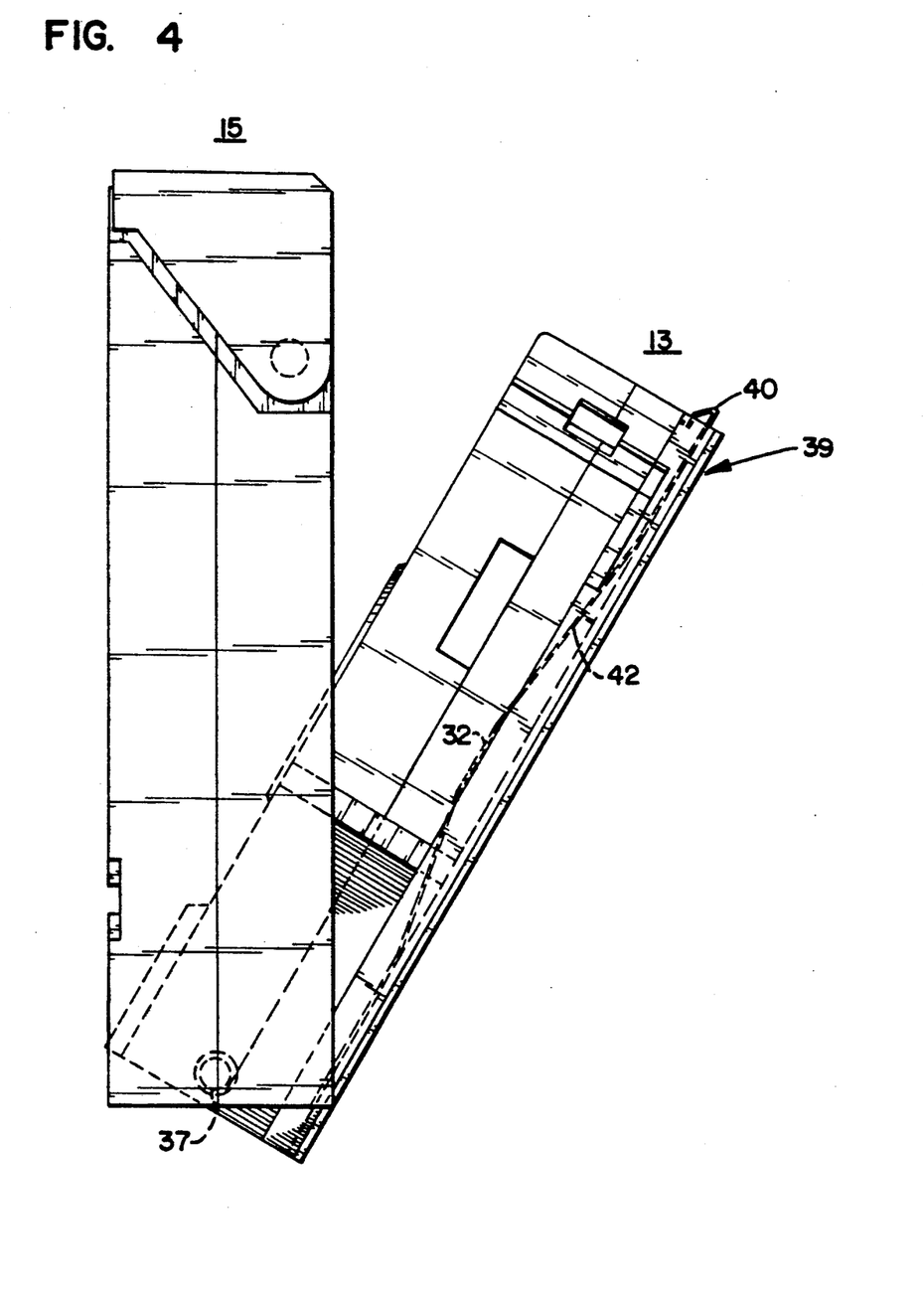
FIG. 4 is a side view of the adaptor showing the cartridge inserted into the adaptor door pocket with the adaptor door in the open position.

After the cartridge is placed in the door pocket, the door is rotated into the "closed" position. The adaptor door 39 is show in the "closed" position 15 in FIG. 5. Turning to FIG. 4, the door rotates about an axis 57. Mechanical stops are provided to limit the door travel in the open direction. It has been found that a angular rotation of approximately 30 degrees is sufficient to facilitate insertion of the cartridge into the door pocket while still providing protection for the tape interconnector apparatus located within the adaptor.

Figure 5:
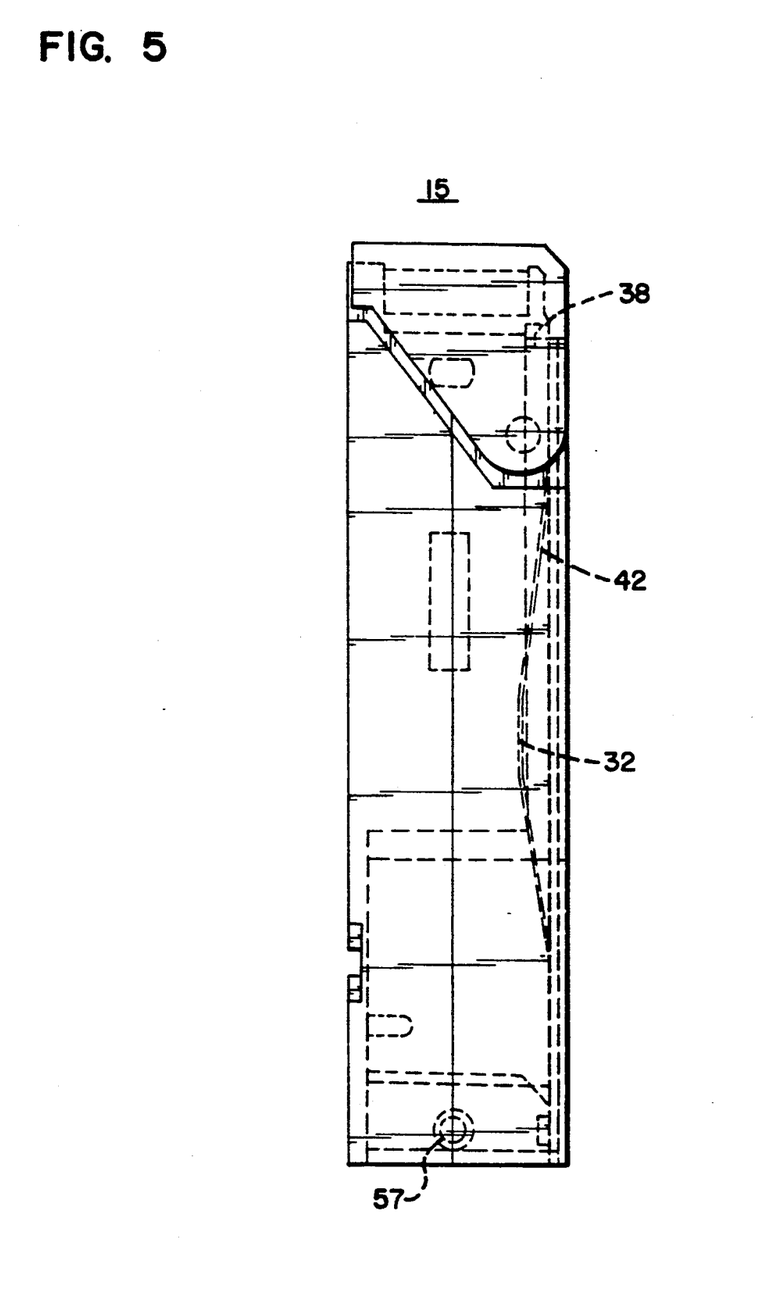
FIG. 5 is a side view of the adaptor showing the adaptor door pocket in the closed position.

When the door is closed as shown in FIG. 5, the latch 40 formed on the spring assembly 42 engages the ledge 38 and prevents the door from opening.

Figure 7:
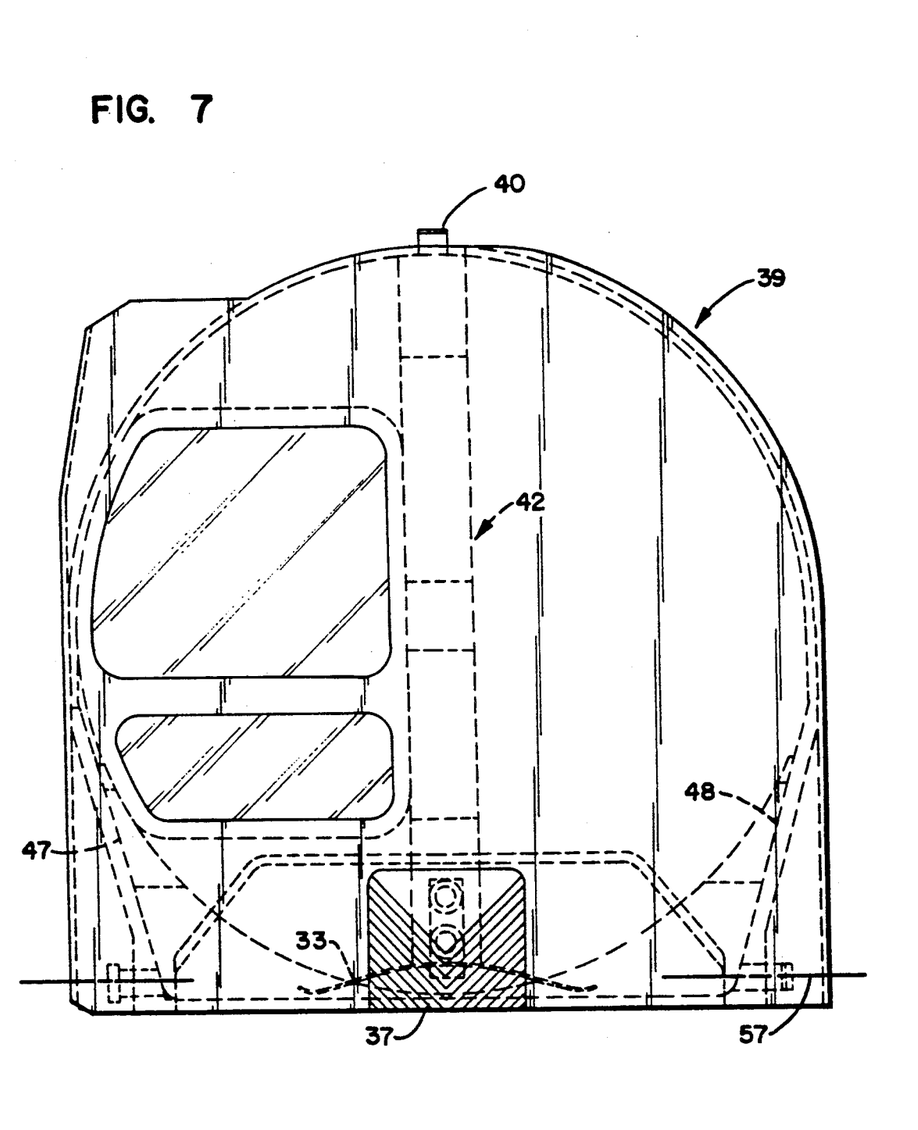
FIG. 7 is a top view of the adaptor door assembly.

Opening the door requires that the user operate thumb slide 37 which is clearly illustrated in FIGS. 6 and 7. Slide spring 33 urges the latch 40 into engagement with the ledge 38. Once the bias force is overcome by retraction of the thumb slide 37 the hairpin torsion door spring 9 located at the pivot axis of the door, urges the door into the open position. The top spring element 32 cooperates with the thrust surface of the snap button 35 on the cartridge (FIG. 3) to urge the hub splines 34 onto the videotape machine hub driver spindle when the door is latched closed.

As discussed previously door closure performs a number of functions.

Door closure makes the interconnection between the tape on the supply reel with the take up reel. Prior to insertion of the cartridge/adaptor assembly into a videotape machine, the tape 14 in the cartridge must be connected to the take up reel 50 located in the adaptor 12. The illustrative interconnection scheme depicted in the Figure is more fully described in U.S. patent application Ser. No. 07/353,826 filed May 18, 1989, which is incorporated by reference herein. Briefly, however, the tape 14 on the supply hub 17 ends in a tape connector 16. The door closure action couples the tape connector 16 with a tether connector 51 located within the adaptor. The tether connector 51 is connected to a leader or tether 52 which is connected to the take-up reel 50 located in the adaptor. Once the cartridge is inserted into the adaptor door 39, rotational movement of the door, during closure, moves the tape connector 16 onto the stationary tether connector 51 and thus completes the tape-tether interconnection.

A tape interconnector interlock assembly 8 is shown in phantom view in FIG. 1. When the tubular tape connector 16 is in the "home" position inside the cartridge, the lever 41 is retracted into the cartridge. After the connector 16 is moved out of the home position, to a point outside the cartridge, then the lever 41 extends through an aperture in the video-cartridge, as shown in FIG. 1. In operation, the lever may extend out of the cartridge, into the adaptor when the cartridge is fully seated in the home adaptor and the ratchet brake is released. The extension of the lever outside the cartridge corresponds to movement of the interconnector out of the home position. With the ratchet/brake released by pins 24 and 25, the winding mechanism may remove the interconnector from the home position in the cartridge. Removal of the tubular interconnector 16 from the "home" position, causes the lever arm 41 to extend outside of the aperture 38. In this extended position the lever 41 engages a recess in the adaptor which prevents the door 39 from being opened.

At this point, the operator will manually advance the interconnection to the take up reel to place the cartridge into the "ready-run" position to prepare the adaptor and the cartridge assembly for insertion into the videocassette machine. The tape-tether interconnection structures are shown mid-way to the "ready-run" position in FIG. 6. This tape advance operation is performed by a manual winding mechanism. Suitable winding mechanisms are taught by U.S. patent application Ser. No. 07/353,826 filed 05/18/89 which is incorporated by reference herein. Briefly however, a thumb-actuated winding mechanism is placed in the adaptor, which engages the gear teeth located on the lower flange of the take-up reel 50, which winds the tether 52 and tape 14 onto the take-up reel. Once the tape tether interconnection is safely seated on the take-up reel 50, the adaptor may be inserted into the videotape machine.

Door closure also results in release of the ratchet/brake mechanism of the present invention to permit supply reel rotation during the tape-tether advance operation previously described. This mechanism is described below.

Figure 3:
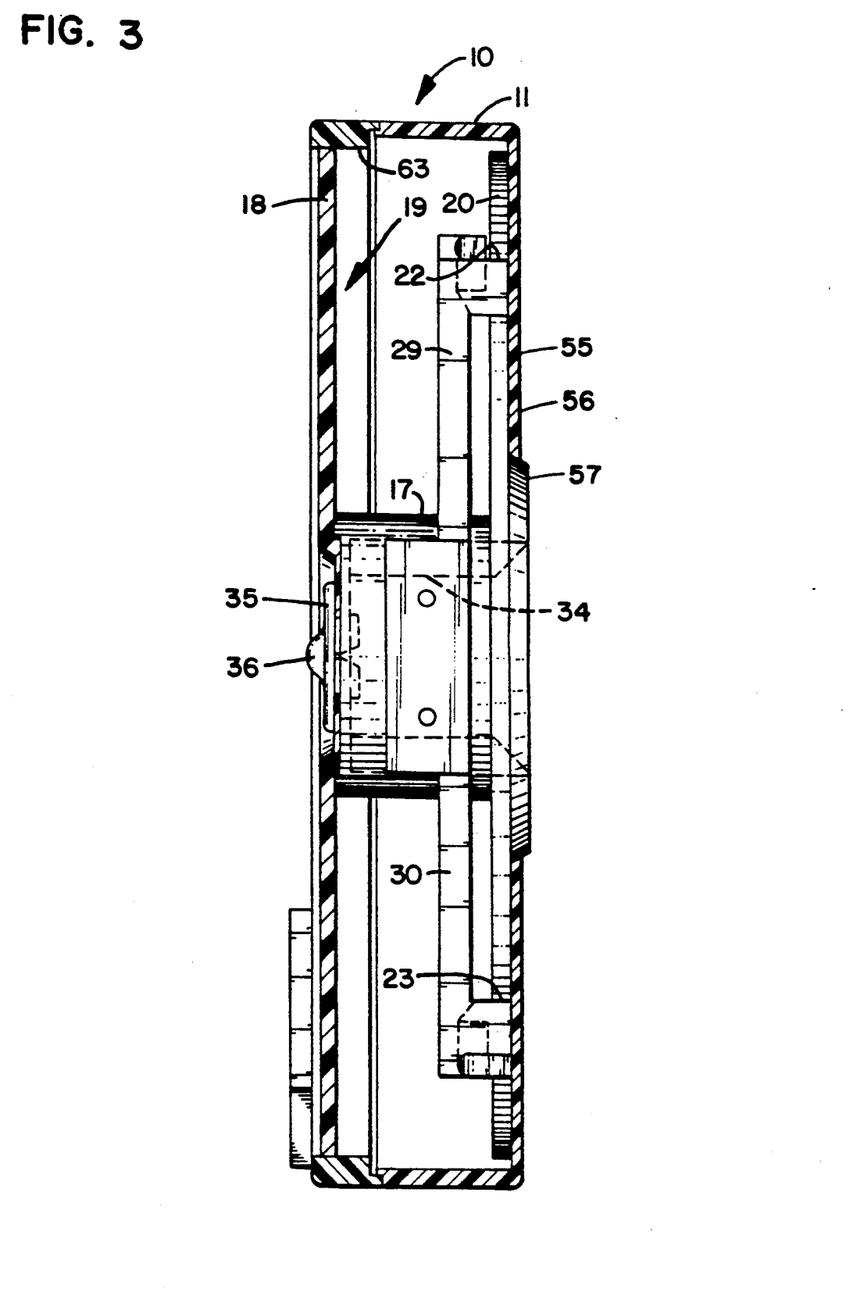
FIG. 3 is an elevation view of the cartridge.

In greater detail, in FIG. 1 there is shown a video-cartridge 10 in accordance with the present invention. The cartridge contains a supply reel 19 which stores a length of magnetic recording tape 14. The supply reel is made up from a central hub 17 and two flanges. With reference to FIG. 3 a bottom flange 20 is located on the bottom of the hub and a top flange 18 is located on top of the hub. As shown in FIG. 3, the bottom flange 20 has gear teeth provided on its periphery while the top flange 18 has a smooth periphery. The two flanges serve to locate the supply reel in the cartridge. As shown in FIG. 3 the smooth periphery of the top flange laterally locates the supply reel in the cartridge housing flange aperture 63. The supply reel 19 is axially located and retained by pair of release fingers located on a release finger assembly 21.

The housing 11 has a substantially planar bottom surface 55. This surface has an aperture 56 which permits the locating collar 57 of the reel assembly to protrude from the cartridge housing.

As shown in the figure, the circular aperture 63 engages the smooth periphery of the top flange 18. As a consequence, the reel assembly can translate or move axially within the housing while radial motion or compliance is limited by the aperture 63.

When the brake fingers 21 and 22 are engaged with the teeth of the bottom flange 20, then small ribs 58 and 59 overlap the periphery of the flange and prevent substantial axial movement of the reel assembly within the housing. However, when the release pins, retract the fingers, then the reel assembly has substantial compliance in the axial direction and can be freely engaged by the drive splines of the VCR tape transport.

In FIG. 1, the release finger assembly 21 includes release fingers 22 and 23. These release fingers are located on cantilever arms 29 and 30 respectively. In FIG. 1, finger 22 is shown in the "relaxed" position where it overlaps the bottom gear flange 20 and restrains it against axial or upward movement. The other release finger 23 is shown in a "retracted" position where it is spaced from the bottom gear flange 20. In practice, both fingers 22 and 23 will be in the relaxed position when the cartridge is outside the adaptor. Both fingers will be in the retracted position when the cartridge is fully seated in the adaptor.

The fingers 22 and 23 are moved from the "relaxed" position to the "retracted" position by a pair of release pins. The release pins 24 and 25 are mounted in the adaptor. They enter the cartridge and engage cam surfaces located on the release fingers, to move the fingers into the "retracted" position, which releases the bottom gear flange 20. Release of the bottom gear flange disconnects the reel 19 from the housing and permits the reel to float axially and to rotate freely in either the rewind or play directions. Axial mobility permits the reel 19 to align with a videotape machine drive spindle which engages the drive spline 34 which is located in the hub as shown in FIG. 3, and FIG. 1. Rotational freedom permits the winder or other tape drive apparatus to move the tape within the cartridge.

Figure 2:
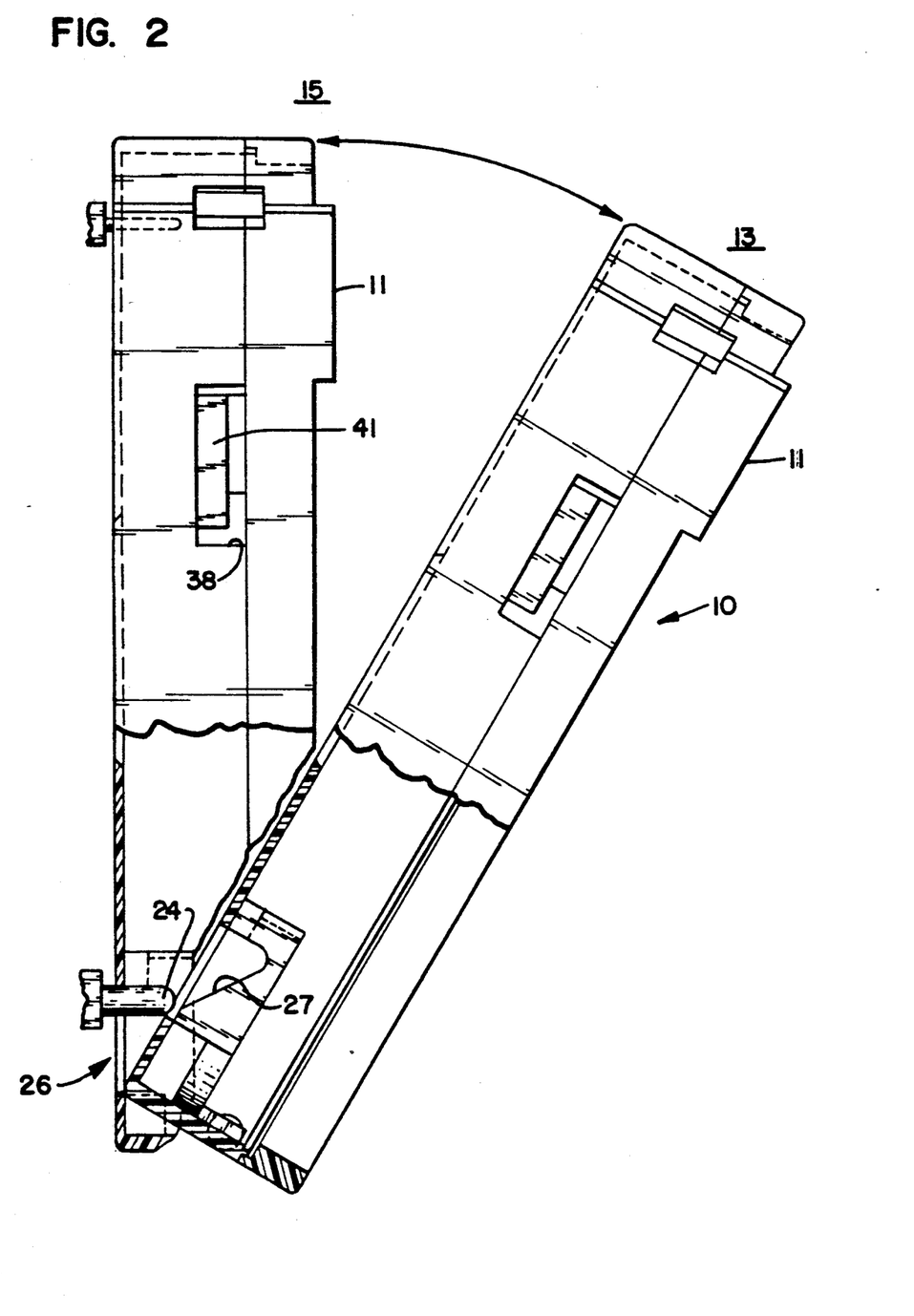
FIG. 2 is a side view of the cartridge in two positions which correspond to the cartridge insertion process, the ratchet/brake mechanism is also partially shown in this figure.

FIG. 2 depicts the path of the cartridge during the insertion process to illustrate the release of the ratchet/brake mechanism. The cartridge 10 moves in an arcuate path as the cartridge is rotated into the adaptor. In this Figure the cartridge is shown without the supply reel and its attendant structures to more clearly illustrate the operation of the release finger assembly during insertion. In the Figure the path begins in the door "open" position depicted at 13 and ends at the door "closed" position depicted at 15. The release pins enter elongated slots formed in the lower surface of the cartridge housing shown as 26. As the release pin 24 enters the cartridge through elongated slot or aperture 26 it engages a cam surface 27 located on the finger 22. The plane of the cam surface is selected so that the gear engagement surface of the finger moves out of engagement with the gear teeth of the lower gear flange 20, when the cartridge is rotated into the closed position. This motion serves to retract the fingers and thus releases the ratchet/brake.

FIG. 3 shows the side elevation of the cartridge showing the release finger assembly in an elevation view which is orthogonal to the view of FIG. 2. For clarity, the video-cartridge depicted in this view does not contain tape. In this view the supply reel 19 is shown in detail. The reel 19 is made up of hub 17 which is rigidly attached to both the top flange 18 and the lower gear flange 20. In general, it is preferred to form the hub integrally with the lower gear flange, while the upper flange 18 is attached to the hub through the use of a snap button 35 which incorporates a thrust surface 36. As shown in this figure the release fingers 22 and 23 overlap and overhang the lower flange 20 since the fingers are in the "relaxed" state.

Figure 8A:
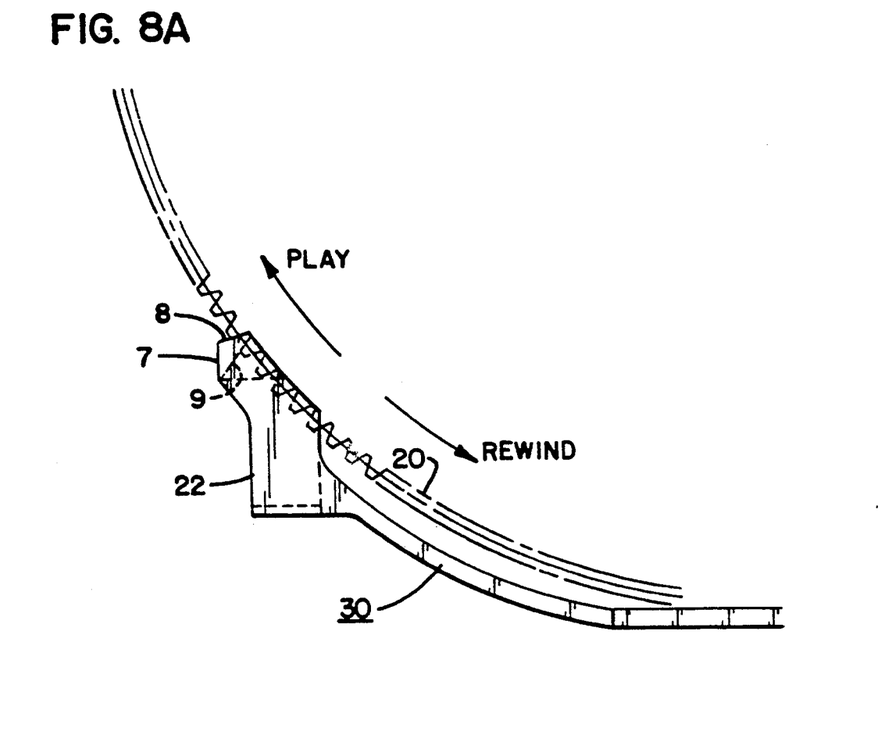
FIG. 8A is a plan view of the ratchet/brake release finger of the ratchet/brake assembly.
Figure 8B:
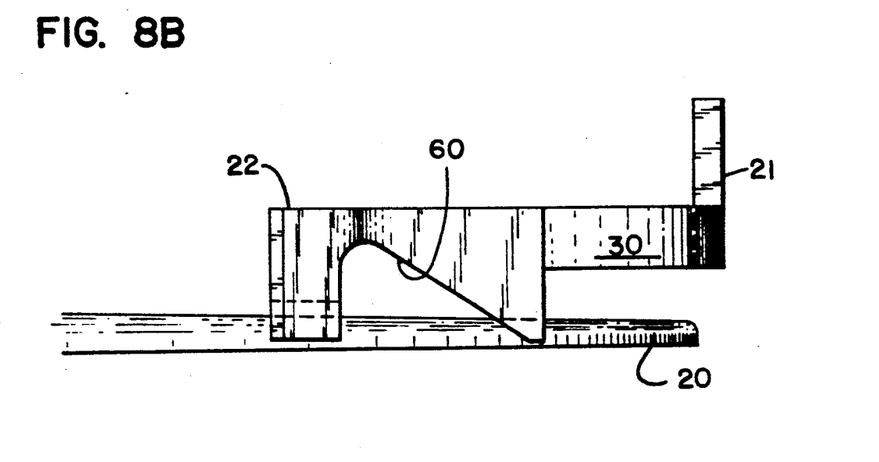
FIG. 8B is an elevation view of the ratchet/brake release finger of the ratchet/brake assembly.

The fingers themselves are supported by cantilever arms 29 and 30 as shown most clearly in FIG. 1, FIG. 3 and FIG. 8. This assembly may be formed as a separate piece and to mounted within the cartridge through a suitable mount.

The cantilever arms act as springs and urge the fingers 22 and 23 into engagement with the gear flange. When these arms are in the relaxed state they cooperate with the fingers to form a ratchet/brake. This aspect is most clearly seen in FIG. 8. The angle that the teeth on the gear flange make with the two contact surfaces 8 and 9 of the fingers tends to force the fingers out of engagement with the teeth when rotated in the "rewind" direction depicted on FIG. 8, while the frictional forces between the teeth and the fingers tends to drag the fingers into engagement when the supply reel 19 is rotated in the "play" direction. This geometry permits the supply reel to be rotated manually to take up slack which may form in the cartridge. However reverse rotation is prevented which prevents tape spillage both inside, and outside the cartridge.

Figure 9:
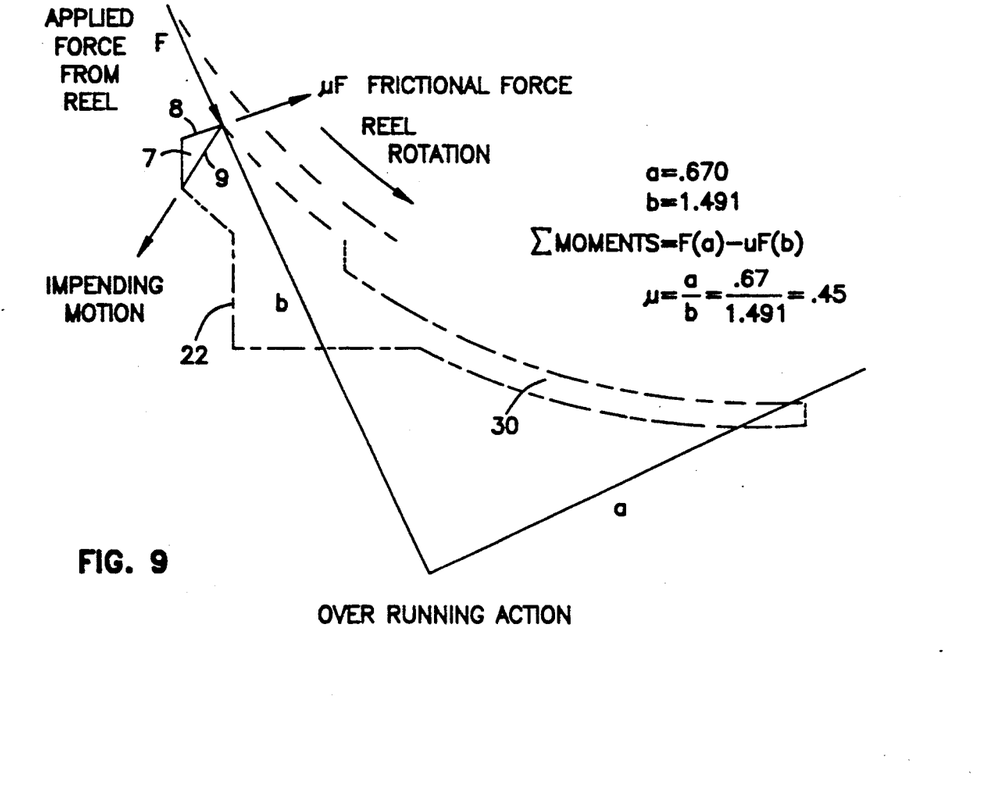
FIG. 9 is a free body diagram showing the over-running operation of the ratchet/brake.
Figure 10:
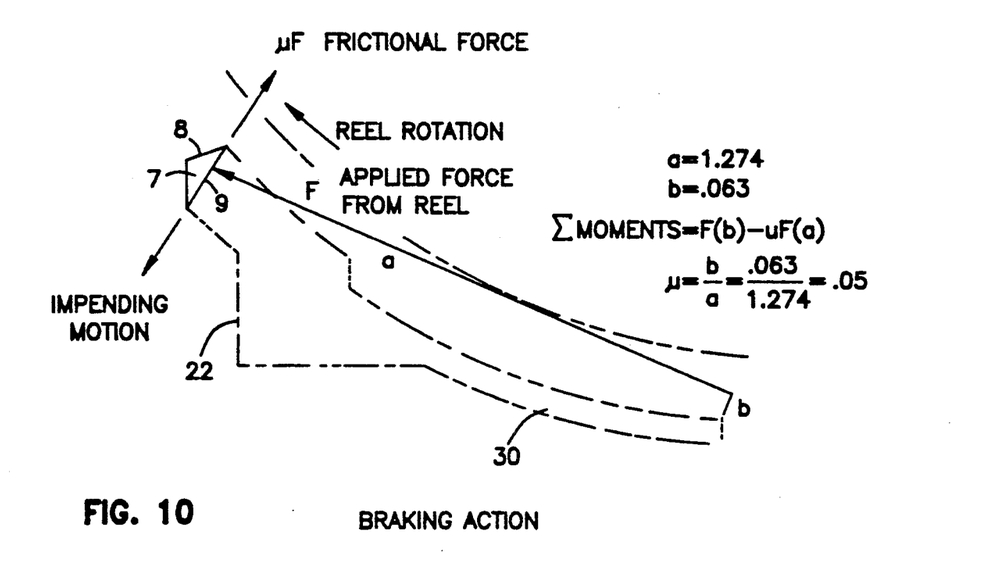
FIG. 10 is a free body diagram showing the braking operation of the ratchet/brake.

In greater detail and with respect to the free body diagrams of FIG. 9 and 10, the finger 22 carries a triangular engagement tooth 7 which has an upper 8 and lower 9 working surface. The cantilever arm 30 positions the apex of the tooth 7 at the root of the gear teeth of the lower flange 20. The application of force to the tooth 7 by the rotation of the reel generates a force which expels the tooth from the teeth when the applied force is in the rewind direction, while the net force draws the tooth 7 into engagement with the gear teeth, as shown in FIG. 10 when the applied force is in the play direction. This composite structure results in an interlock function which releases the tape for unrestrained rotation when the cartridge in fully seated in the adaptor and which permits unidirectional rotation when the cartridge is removed from the adaptor.

This illustrative embodiment provides a convenient and effective method of storing and using videotape.

What is claimed is:

1. A videotape cartridge for storing a length of videotape comprising:

a housing having wall means for defining an interior;

a supply reel located within said housing and supported by said wall means, for rotation about an axis;

said supply reel having a hub, a top flange and a bottom flange, said bottom flange having gear teeth formed at the periphery of said bottom flange, said gear teeth being coplanar with and formed in the same plane as said bottom flange;

said gear teeth having a generally triangular planform shape to receive driving power to rotate said reel;

said tape having a first end and a second end, said first end being anchored to said hub and said second end being positioned in a tape exit aperture formed in said wall means;

a ratchet brake means located proximate said bottom flange, said ratchet brake means operable in a first engaged operating position, and a second released operating position, said ratchet brake means having at least one engagement tooth, said engagement tooth having a generally triangular planform, for engaging, at least one of said bottom flange gear teeth, when said ratchet brake is in said first operating position for preventing rotation in a first rotational direction and for permitting rotation in a second rotational direction.

2. The videotape cartridge of claim 1 wherein said ratchet brake means comprises:

cantilever arm means mounted on said housing, and located within said housing for supporting finger means;

said finger means located on said cantilever arm means proximate said gear teeth, when said ratchet brake is in said first operating position, said finger means, having an engagement tooth means for engagement with one of said gear teeth, said finger means for moving said engagement tooth into engagement with the root of one of said teeth during rotation in said first rotational direction and for moving said engagement tooth away from said gear tooth root during rotation in said second rotational direction, whereby said fingers prevent rotation of said supply reel in said first rotational direction and, whereby said fingers permit rotation in said second rotational direction, while said ratchet brake is in said first operating position.

3. A tape cartridge for storing tape comprising:

a tape supply reel, having a top flange and a bottom flange and a central hub;

said central hub defining an axis for rotation about said axis and defining a direction for movement of said reel axially along said axis;

a cartridge housing, for retaining said reel;

a length of tape having a first end attached to said central hub and a second end positioned at a tape exit aperture in said housing;

said housing having a bottom surface proximate said lower flange and having a top surface proximate said top flange, said top surface having a aperture of substantially the same diameter as said top flange such that said top flange can move axially through said top surface;

resilient arm means located within said housing, said resilient arm means having a first operating position and a second operation position, for engaging said lower flange to retain said reel inside of said housing and for restraining rotation of said reel within said housing when said resilient arm means are in said first operating position, and for disengaging said lower flange and for permitting axial movement of said reel along said axis when said resilient arms are in said second operating position.

4. A tape cartridge for storing a length of tape comprising:

a top flange;

a bottom flange;

a hub body;

said hub body having an interior containing a drive spline;

said hub body having a first substantially circular top surface and having a second substantially circular bottom surface and having a third substantially cylindrical surface;

said tape having a first end and a second end, said first end being anchored to said third substantially cylindrical surface and said second end being positioned in a tape exit aperture formed in a cartridge housing;

said hub body having a locating collar, located adjacent said bottom surface, said top flange attached to said hub top surface, said bottom flange attached to said hub bottom surface, said top flange, said bottom flange and said hub together, forming a rotatable reel assembly, having a rotational axis defined by the axis of said drive spline;

said housing having an interior formed in part by a planar bottom surface, said planar bottom surface, having a locating collar receiving aperture with a diameter substantially equal to the diameter of said locating collar, for receiving and positioning said locating collar;

said housing having a top flange receiving aperture, formed in said housing, opposite said locating collar aperture, for receiving and locating said top flange for rotational movement about said rotational axis;

said locating collar receiving aperture and said top flange receiving aperture forming means for permitting axial movement of said reel assembly along said rotational axis;

ratchet brake means located proximate said bottom flange for engaging said bottom flange for restraining axial movement when said ratchet brake is in a first operating position, and for permitting axial movement when said ratchet brake is in a second operating position.

5. The cartridge of claim 4 wherein said bottom flange has a periphery having a plurality of gear tooth form teeth formed thereon for driving said reel.

6. The cartridge of claim 5 wherein said ratchet brake means comprises:

a first brake finger means, having first and second engagement surfaces for cooperative engagement with said teeth, for moving into engagement with the root of a said tooth during rotation in a first rotational direction, when said ratchet brake is in said first operating position;

a second brake finger having first and second engagement surfaces for cooperative engagement with one of said teeth, for moving out of engagement with one of said teeth during rotation in a first rotational direction, when said ratchet brake is in said first operating position;

a first resilient support arm, coupled to said first brake finger, for supporting said first brake finger proximate the periphery of said bottom flange;

a second resilient support arm, coupled to said second brake finger, for supporting said second brake finger proximate the periphery of said bottom flange.

7. The cartridge of claim 6 further comprising:

a first release pin access hole formed in said planar bottom surface of said housing proximate said first brake finger, whereby a tape transport borne release pin may enter said housing;

a first release cam surface located on said first brake finger adapted for actuation by a release pin, for disengaging said first brake finger from said bottom flange, and for moving said ratchet brake into second operating position;

a second release pin access hole formed in said planar bottom surface of said housing proximate said second brake finger, whereby a tape transport borne release pin may enter said housing;

a second release cam surface located on said second brake finger adapted for actuation by a release pin, for disengaging said second brake finger from said bottom flange, and for moving said ratchet brake into said second operating position.

8. The cartridge of claim 7 further comprising:

a first flange engagement rib, located on said first brake finger, overlying said bottom flange, for restraining axial movement of reel assembly when said first brake finger is engaged with said bottom flange and said ratchet brake is in said first operating position;

a second flange engagement rib, located on said second brake finger, overlying said bottom flange, for restraining axial movement of reel assembly when said second brake finger is engaged with said bottom flange and said ratchet brake is in said first operating position.

* * * * *

UNITED STATES PATENT AND TRADEMARK OFFICE
CERTIFICATE OF CORRECTION

PATENT NO. : 5,072,325
DATED : December 10, 1991
INVENTOR(S) : Jerrold K. Weeks, et. al.

It is certified that error appears in the above-indentified patent and that said Letters Patent is hereby corrected as shown below:

On the Title page, item [73], Assignee: delete the word mining and insert therefor --Mining--.

In column 1, line 48, please delete the word "art" and insert therefor --act--

In column 2, lines 1 and 2, please delete "the reverse play direction" and insert therefor --"the reverse" or "play" direction--

In column 2, line 54, please delete (FIG. 6 and 7) and insert therefor --FIGS. 6 and 7--

In column 2, line 66, please delete the word "show" and insert therefore --shown--

In column 3, line 1, before the word "angular", please delete "a" and insert therefor --an--

UNITED STATES PATENT AND TRADEMARK OFFICE
CERTIFICATE OF CORRECTION

PATENT NO. : 5,072,325
DATED : December 10, 1991
INVENTOR(S) : Jerrold K. Weeks, et. al.

It is certified that error appears in the above-indentified patent and that said Letters Patent is hereby corrected as shown below:

In column 4, line 29, before the word "pair", please insert --a--

In column 5, line 44, please delete "to mounted" and insert therefor --is to be mounted--

In column 5, line 54, please delete the word "on" and insert therefor --in--

In column 5, line 63, please delete "FIG. 9 and 10" and insert therefor --FIGS. 9 and 10--

In column 6, line 24, please delete the word "planform" and insert therefor --planiform--

In column 6, line 36, please delete the word "planform" and insert therefor --planiform--

In column 8, lines 6 and 7, after the word "gear", please delete the words "tooth form"

Signed and Sealed this

Twenty-second Day of November, 1994

Attest:

BRUCE LEHMAN

*Attesting Officer*    *Commissioner of Patents and Trademarks*